United States Patent
Tsuji

(10) Patent No.: US 8,818,055 B2
(45) Date of Patent: Aug. 26, 2014

(54) IMAGE PROCESSING APPARATUS, AND METHOD, AND IMAGE CAPTURING APPARATUS WITH DETERMINATION OF PRIORITY OF A DETECTED SUBJECT AND UPDATING THE PRIORITY

(71) Applicant: Canon Kabushiki Kaisha, Tokyo (JP)

(72) Inventor: Ryosuke Tsuji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/965,355

(22) Filed: Aug. 13, 2013

(65) Prior Publication Data

US 2013/0322695 A1 Dec. 5, 2013

Related U.S. Application Data

(62) Division of application No. 12/634,347, filed on Dec. 9, 2009, now Pat. No. 8,682,040.

(30) Foreign Application Priority Data

Dec. 11, 2008 (JP) .................................. 2008-316275

(51) Int. Cl.
*G06K 9/36* (2006.01)

(52) U.S. Cl.
USPC ......................................................... 382/118

(58) Field of Classification Search
None
See application file for complete search history.

(56) References Cited

U.S. PATENT DOCUMENTS

2008/0199056 A1* 8/2008 Tokuse .......................... 382/118

* cited by examiner

*Primary Examiner* — Brian P Werner
(74) *Attorney, Agent, or Firm* — Cowan, Liebowitz & Latman, P.C.

(57) ABSTRACT

Face regions are detected from a captured image, and a weight of each detected face region is computed based on a size and/or a position of the detected face region. Then a previous priority ranking weight is computed based on a priority ranking determined in previous processing. A priority of the face region is computed from the weight and the previous priority ranking weight. For example, if the continuous processing number exceeds the threshold the priority ranking weight is reduced. After the processing is completed for all face regions, a priority ranking of each face region is determined based on the priority computed for each face region.

8 Claims, 10 Drawing Sheets

F I G. 5A
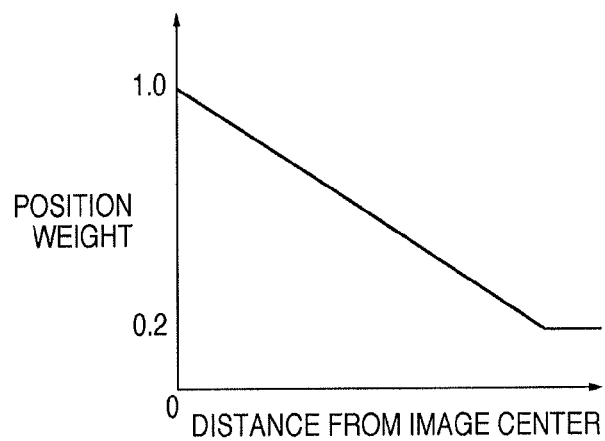
F I G. 5B
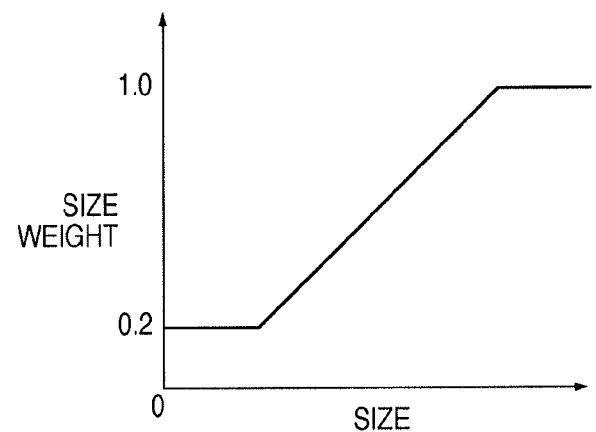
F I G. 6
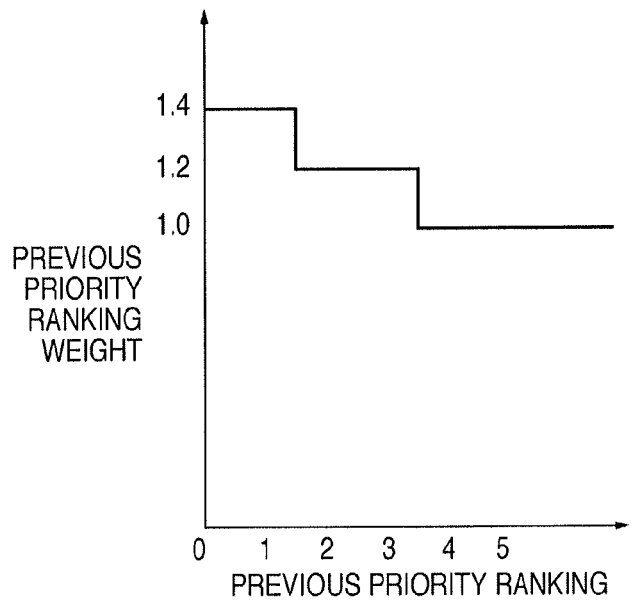

IMAGE PROCESSING APPARATUS, AND METHOD, AND IMAGE CAPTURING APPARATUS WITH DETERMINATION OF PRIORITY OF A DETECTED SUBJECT AND UPDATING THE PRIORITY

CROSS-REFERENCE TO RELATED APPLICATION

This application is a divisional of application Ser. No. 12/634,347, filed Dec. 9, 2009, the entire disclosure of which is hereby incorporated by reference.

BACKGROUND OF THE INVENTION

1. Field of the Invention

The present invention relates to an image processing apparatus, an image processing method, and an image capturing apparatus, and in particular relates to an image processing apparatus, an image processing method, and an image capturing apparatus that can detect a specific subject such as a person, an animal, or an object included in an image, or a part of the subject.

2. Description of the Related Art

An image processing technique of automatically detecting a specific subject from an image is highly useful, and can be utilized, for example, for specifying a face region of a person in a moving image. Such an image processing technique can be employed in many fields including teleconferences, man-machine interfaces, security systems, monitor systems for tracking human faces, and image compression. A digital camera or digital video camera that detects a face from a captured image and optimizes focus or exposure for the detected face is also known. Japanese Patent Laid-Open No. 2005-318554 discloses an apparatus that focuses on a face detected from an image and captures an image at an optimum exposure for the face.

Furthermore, there is a known image capturing apparatus that has a function of selecting a subject that serves as a main subject from a plurality of subjects, in order to perform more accurate AF (Autofocus) and the like even in the case where a plurality of specific subjects are present in an image.

Japanese Patent Laid-Open No. 2002-51255 discloses an image capturing apparatus that selects a subject that serves as a main subject based on the states of the subjects present in an image. A state of a subject refers to various parameters indicating, for example, a distance from the image capturing apparatus to the subject, an area of the subject in the image, a position of the subject in the image, a distance between subjects, and the like. Moreover, Japanese Patent Laid-Open No. 2008-5438 discloses an image capturing apparatus that suppresses frequent switching of a main subject, by selecting a current main subject in consideration of information about a previously selected main subject.

One method for selecting a main subject from a plurality of subjects according to a conventional technique is a method of performing a main subject selection process based only on the states of subjects at a specific time. This method has the advantage of enabling the appropriate main subject at the specific time to be selected, but also has the problem of causing frequent switching of the main subject between a plurality of subjects.

This problem is described below, with reference to FIG. 1. In an example shown in FIG. 1, subjects 100 and 101 are each detected by an image capturing apparatus in frames #1 to #4 of a moving image in chronological order. In FIG. 1, a main subject is indicated by a solid line box, and a subject other than the main subject is indicated by a dashed line box.

As an example, the main subject is determined according to a priority that is computed based on a distance from the image center to the gravity center of a subject image and a size of the subject image, in the states of the detected subjects 100 and 101. Suppose the distance from the image center to the subject gravity center and the subject size, which indicate the state of the subject, are similar between the two subjects 100 and 101, as shown in FIG. 1. In such a case, slight changes in the states of the two subjects 100 and 101 cause frequent switching of the main subject between the subjects 100 and 101. That is, priority rankings of the detection results change.

In the case of performing AF and the like on the main subject, when the main subject is frequently switched between a plurality of subjects, such changes of the main subject cause an AF lens and the like to be frequently driven. This induces a possibility of reducing the operational stability and leading to a loss of accuracy of focusing and the like. In addition, in the case where a marker or the like indicating the main subject is displayed in the display of the image capturing apparatus, such frequent changes of the marker display as shown in frames #1 to #4 in FIG. 1 are annoying to the user.

Another method for selecting a main subject from a plurality of subjects is a method of performing a main subject selection process based on the states of subjects at a specific time and information on a previously selected main subject. This method has the advantage of suppressing frequent changes of the main subject, but also has the problem of making it difficult to switch the main subject even in a scene where the main subject needs to be switched.

This problem is described below, with reference to FIG. 2. In an example shown in FIG. 2, subjects 102 and 103 are each detected by an image capturing apparatus in frames #1 to #4 of a moving image in chronological order. In FIG. 2, a main subject is indicated by a solid line box, and a subject other than the main subject is indicated by a dashed line box.

As an example, the main subject is determined according to a priority that is computed based on a distance from the image center to the gravity center of a subject image, a size of the subject image, and a priority ranking in a previous frame, in the states of the detected subjects 102 and 103. To suppress frequent switching of the main subject, it is necessary to increase, in the priority computation, the influence of the priority ranking in the previous frame to a certain extent.

In detail, priority rankings of the subjects 102 and 103 in frame #1 in FIG. 2 are determined first. In this example, the subject 102 is determined to have a higher priority ranking than the subject 103, so that the subject 102 is selected as the main subject. Once the main subject has been determined, in the following frames #2 to #4 a situation where it is difficult to switch the main subject arises, due to the influence of the priority rankings in frame #1.

If the main subject is not switched from the subject 102 to the subject 103 even when the states of the subjects in the captured image are as shown in frame #4 in FIG. 2, the user may feel something is wrong.

SUMMARY OF THE INVENTION

To solve at least one of these problems of the conventional techniques, the present invention provides an image processing apparatus, an image processing method, and an image capturing apparatus that can determine an appropriate priority ranking for a detected subject.

According to one aspect of the present invention, there is provided an image processing apparatus that determines a priority ranking of a subject detected from an image, the image processing apparatus comprising: a detection unit that detects one or more subjects from an image; a computation unit that computes a priority for determining a priority ranking, for each of the subjects detected by the detection unit; and a determination unit that determines the priority ranking of each of the subjects detected by the detection unit, based on the priority computed by the computation unit, wherein the computation unit: assigns a larger weight to a subject detected by the detection unit at least one of when the subject has a larger size and/or when the subject is positioned nearer a center of the image; corrects the assigned weight by a larger weight when a most recent priority ranking determined for the subject by the determination unit in a previous image from which the subject is detected is higher; computes a higher priority for the subject when the corrected weight is larger; and, when a predetermined condition is satisfied, computes the priority with a reduced amount of correction by the weight of the most recent priority ranking.

According to another aspect of the present invention, there is provided an image processing method for determining a priority ranking of a subject detected from an image, the image processing method comprising: a detection step of detecting one or more subjects from an image; a computation step of computing a priority for determining a priority ranking, for each of the subjects detected in the detection step; and a determination step of determining the priority ranking of each of the subjects detected in the detection step, based on the priority computed in the computation step, wherein the computation step includes: assigning a larger weight to a subject detected in the detection step at least one of when the subject has a larger size and/or when the subject is positioned nearer a center of the image; correcting the assigned weight by a larger weight when a most recent priority ranking determined for the subject in the determination step in a previous image from which the subject is detected is higher; computing a higher priority for the subject when the corrected weight is larger; and, when a predetermined condition is satisfied, computing the priority with a reduced amount of correction by the weight of the most recent priority ranking.

Further features of the present invention will become apparent from the following description of exemplary embodiments with reference to the attached drawings.

BRIEF DESCRIPTION OF THE DRAWINGS

FIG. 5A is a diagram showing an example of a relationship between a distance from the image center to the gravity center of a face region and a position weight of the face region.

FIG. 5B is a diagram showing an example of a relationship between a size of a face region and a size weight of the face region.

FIG. 6 is a diagram showing an example of a relationship between a previous priority ranking of a face region and a previous priority ranking weight of the face region.

DESCRIPTION OF THE EMBODIMENTS

Preferred embodiments of the present invention will now be described in detail in accordance with the accompanying drawings.

Figure 1:
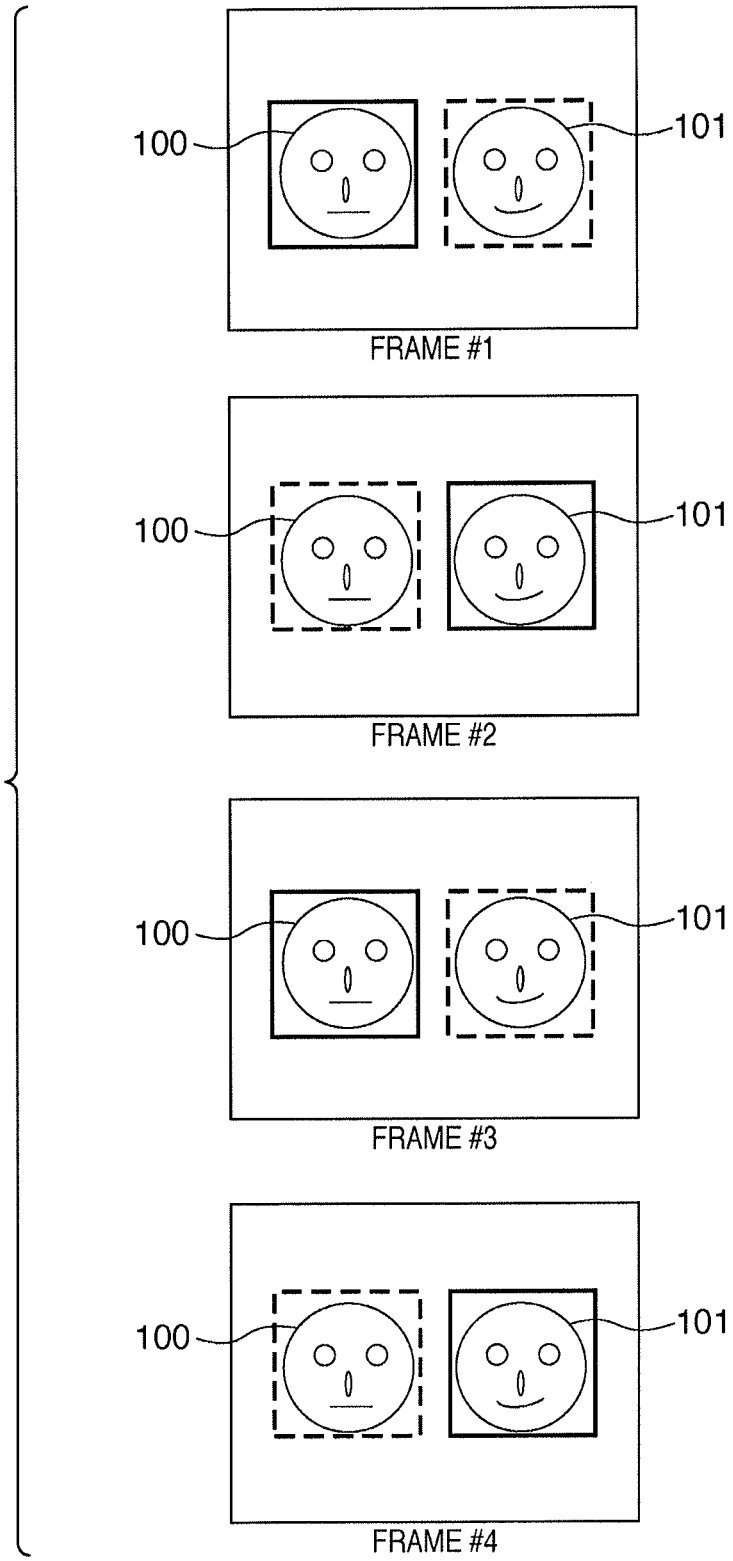
FIG. 1 is a diagram explaining a problem of a conventional technique.
Figure 2:
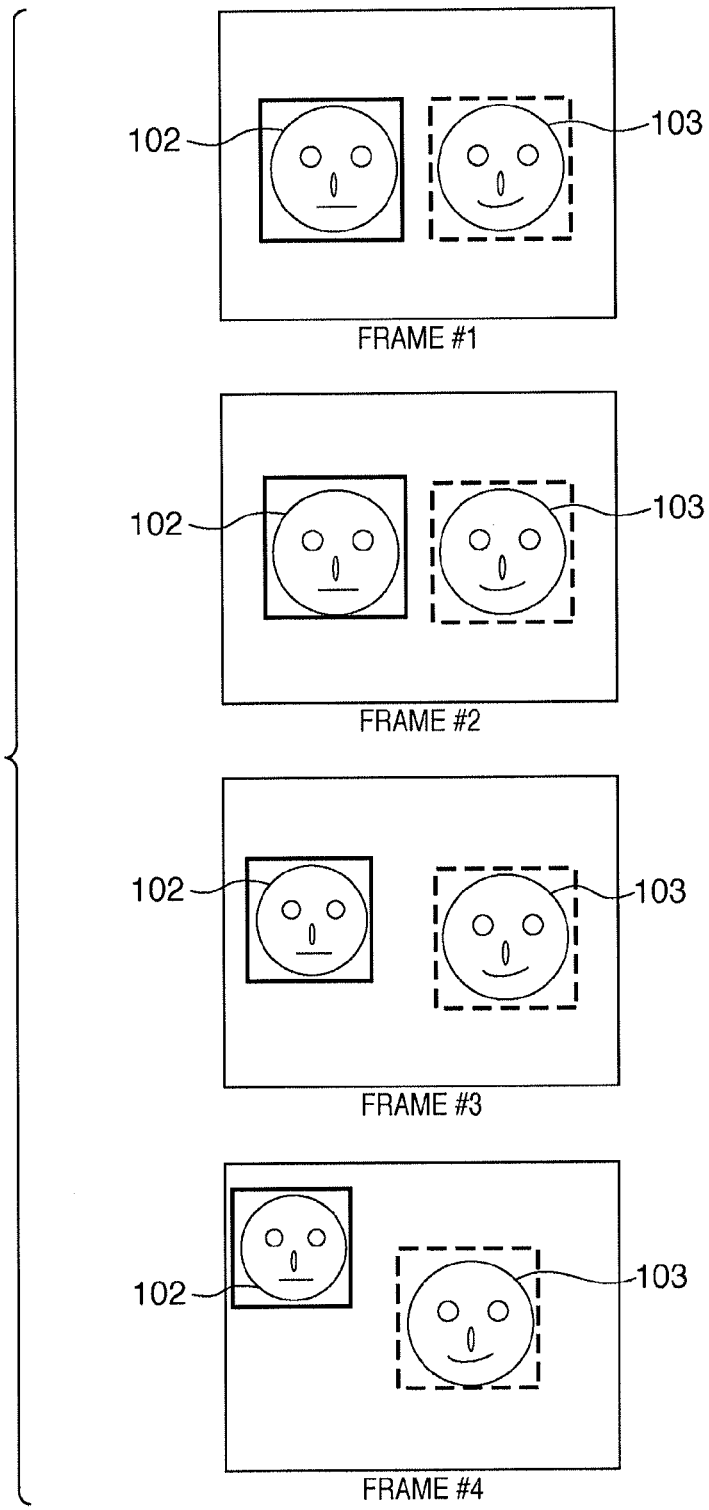
FIG. 2 is a diagram explaining a problem of a conventional technique.
Figure 3:
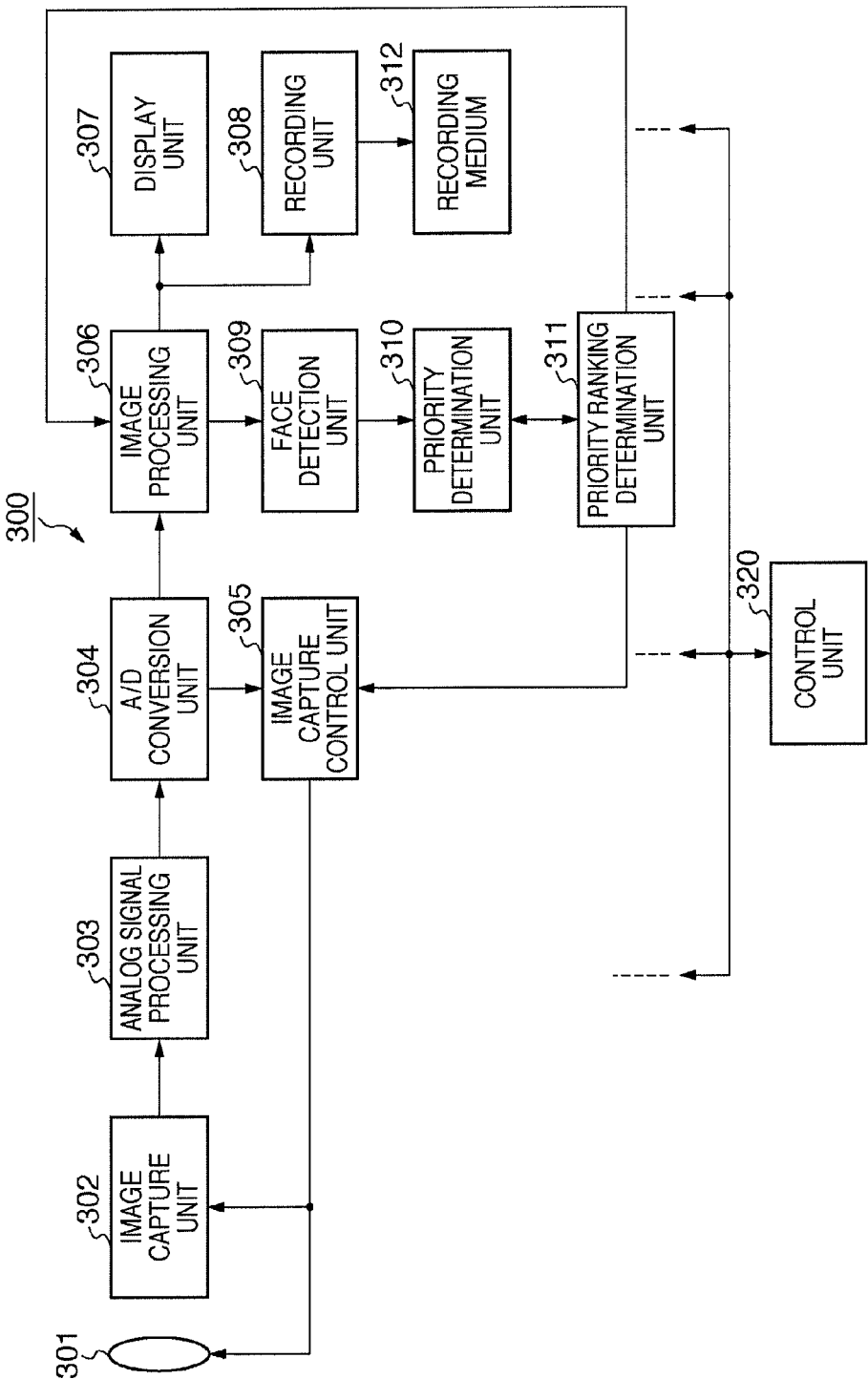
FIG. 3 is a block diagram showing an example of a structure of an image capturing apparatus that is commonly applicable to each embodiment of the present invention.

FIG. 3 shows an example of a structure of an image capturing apparatus 300 that is commonly applicable to each embodiment of the present invention. An image capture unit 302 includes an imaging optical system, an image sensor such as a CCD image sensor or a CMOS image sensor, and a drive circuit that drives the image sensor. Light from a subject is collected by a photographic lens 301 provided in the imaging optical system and applied to the image sensor in the image capture unit 302. In the image capture unit 302, the incident light is converted to a charge per pixel by photoelectric conversion in the image sensor. The image capture unit 302 reads the charge converted from the light per pixel, and outputs the read charge as an image signal.

Note that a moving image signal can be obtained by sequentially reading charges from the image sensor at a predetermined time interval such as a frame period in the image capture unit 302.

The image signal output from the image capture unit 302 undergoes analog signal processing such as correlated double sampling (CDS) and gain adjustment in an analog signal processing unit 303. The image signal output from the analog signal processing unit 303 is converted to a digital signal in an A/D conversion unit 304, as image data.

The image data output from the A/D conversion unit 304 is supplied to each of an image capture control unit 305 and an image processing unit 306. The image processing unit 306 performs predetermined image processing, such as gamma correction and white balancing, on the supplied image data. In addition to ordinary image processing, the image processing unit 306 has a function of performing image processing that uses information relating to a region of a face in an image, which is supplied from a face detection unit 309 described later. The image processing unit 306 can also perform a process of correcting image blurring caused by hand movement, based on angular velocity information output from a gyro sensor (not shown).

The image data output from the image processing unit 306 is supplied to a display unit 307. The display unit 307 as a display means includes a display device such as an LCD or an organic EL display, and a drive circuit that drives the display device based on the image data. The display unit 307 displays the supplied image data on the display device. By sequentially displaying images that are serially captured in chronological order in the display unit 307, the display unit 307 can function as an electronic view finder (EVF) for monitoring captured images.

The image data output from the image processing unit 306 is also supplied to a recording unit 308 and recorded on a recording medium 312. As an example, the recording medium 312 is a nonvolatile semiconductor memory that can be removably attached to the image capturing apparatus 300. The present invention is not limited to this and the recording medium 312 may be an internal memory or internal hard disk (not shown) included in the image capturing apparatus 300, or an external apparatus communicably connected via a communication unit (not shown). The recording medium 312 may also be an optical disc or magnetic tape.

The image data output from the image processing unit 306 is also supplied to the face detection unit 309. The face detection unit 309 detects a human face in an image, and specifies the number of persons that are subjects and the face regions of those persons. The face detection unit 309 can perform face detection using a known face detection method.

Known face detection techniques include a method of using face-related knowledge (skin tone information, parts such as the eyes, nose, and mouth), a method of configuring a discriminator for face detection according to a learning algorithm represented by a neural network, and so on. These methods are typically combined to perform face recognition, in order to improve a face recognition rate. As a concrete example, a face detection method using a wavelet transform and an image feature quantity is described in Japanese Patent Laid-Open No. 2002-251380.

The face detection unit 309 outputs, for example, a position, a size, a tilt, a degree of reliability, and the like for each of the faces of all detected persons, as face region information. The degree of reliability referred to here is a value indicating how reliable the detection result is, and is determined during the face detection process.

One example of a method for computing the degree of reliability is a method of comparing a feature of an image of a subject stored beforehand and a feature of an image of a face region detected by the face detection unit 309 to obtain a probability that the image of the detected face region is the image of the subject, and computing the degree of reliability from this probability. For instance, a face image according to a typical face or an image obtained by extracting and graphically representing a facial feature may be used as the image of the subject stored beforehand. Another example of the method for computing the degree of reliability is a method of computing a difference between a feature of an image of a subject stored beforehand and a feature of an image of a face region detected by the face detection unit 309 and computing the degree of reliability from the difference. The degree of reliability of the face detection may be computed using other methods. When the output degree of reliability is high, the probability of false detection is low. When the output degree of reliability is low, the probability of false detection is high.

The face region information detected by the face detection unit 309 is supplied to a priority determination unit 310. First, the priority determination unit 310 determines detection results each of which can be regarded as a face as intended, namely, face regions, from information such as the degree of reliability included in the detected face region information. As an example, it is assumed that a face region whose degree of reliability is not lower than a threshold can be regarded as a face as intended.

The priority determination unit 310 then computes a priority of each detection result (hereafter referred to as "face region") determined to be regarded as a face as intended, based on a state of a face and a previous priority ranking. The state of the face includes a distance from the image center to the gravity center of the face image, and a size of the face image. The extent to which the previous priority ranking is taken into consideration in the priority computation changes depending on a predetermined condition described later. Note that information on the previous priority ranking is supplied to the priority determination unit 310 from a priority ranking determination unit 311 described later. The priority determination unit 310 supplies a result of the computing of the priority of each face region, to the priority ranking determination unit 311.

The priority ranking determination unit 311 determines a priority ranking of each face region, according to the priority of each face region computed by the priority determination unit 310. A face having a higher priority is given a higher priority ranking. Each face region prioritized by the priority ranking determination unit 311 is supplied to the image processing unit 306 and the image capture control unit 305. Each face region prioritized by the priority ranking determination unit 311 is also supplied to the priority determination unit 310 as a previous priority ranking result used in priority computation. The priority determination unit 310 uses this priority ranking result supplied from the priority ranking determination unit 311, as the previous priority ranking when computing the priority of each face region.

The image capture control unit 305 controls a focusing control mechanism and an exposure control mechanism (not shown) in the photographic lens 301, based on the image data output from the A/D conversion unit 304. When controlling the focusing control mechanism and the exposure control mechanism, the image capture control unit 305 can use the prioritized face region information supplied from the priority ranking determination unit 311. For example, the focusing control mechanism sets only a face of a face region having the highest priority ranking of the faces detected by the face detection unit 309, as a control target. For example, the exposure control mechanism performs processing on, as a control target, faces of face regions having the highest to third highest rankings of the faces detected by the face detection unit 309.

Thus, the image capturing apparatus 300 in this embodiment has a function of performing an imaging process in consideration of the information on face regions in a captured image. The image capture control unit 305 also controls output timings, output pixels, and the like of the image sensor. The image capture control unit 305 further performs a process of driving a zooming mechanism (not shown) provided in the imaging optical system, according to a user operation.

A control unit 320 controls an entire operation of the image capturing apparatus 300. For example, the control unit 320 includes a CPU, a ROM, and a RAM, and controls each unit of the image capturing apparatus 300 by operating through the use of the RAM as a work memory according to a program stored in the ROM beforehand. Here, the functions of the priority determination unit 310 and the priority ranking determination unit 311 described above can be realized by the program in the control unit 320. Furthermore, the function of the face detection unit 309 may be realized by the program. Alternatively, these functions may be realized by hardware controlled by the control unit 320.

First Embodiment

Figure 4:
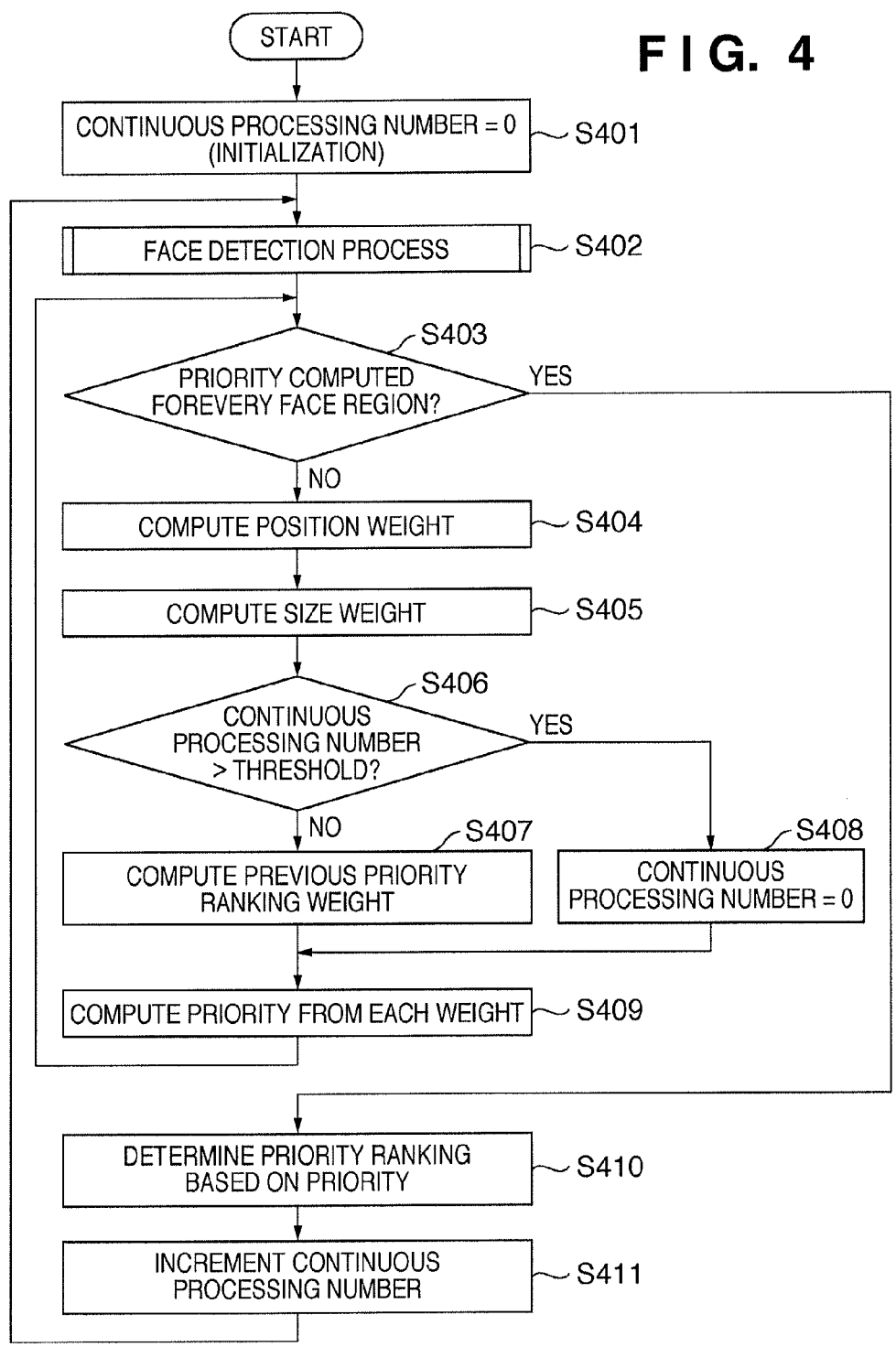
FIG. 4 is a flowchart showing an example of processing for determining priority rankings of face regions according to a first embodiment of the present invention.

The following describes a first embodiment of the present invention. FIG. 4 is a flowchart showing an example of processing for determining priority rankings of face regions according to the first embodiment. The processes in this flowchart are executed by the control unit 320 controlling the face detection unit 309, the priority determination unit 310, and the priority ranking determination unit 311 according to the program. The present invention is not limited to this and the processes in the flowchart of FIG. 4 may be executed autonomously by the face detection unit 309, the priority determination unit 310, and the priority ranking determination unit 311 in cooperation with each other.

First, in step S401, the control unit 320 initializes a continuous processing number for counting the number of times the series of processes is performed to 0. In step S402 which follows, the face detection unit 309 performs a face detection process on the image data of one frame, thereby detecting face regions in the image. The number of face regions in the image, a position, a size, and a degree of reliability of each face region in the image, and the like are obtained as information on the detected face regions. Here, the control unit 320 sets, based on the face detection results by the face detection unit 309, only the results that are determined to be faces as valid data. The control unit 320 then advances the processing to step S403.

In step S403, the control unit 320 determines whether or not priority computation by the processes of steps S404 to S409 described later has been performed for every result determined to be valid as a face in step S402, that is, every face region detected in the image. When the control unit 320 determines that priority computation has been performed for every valid face region, the control unit 320 advances the processing to step S410. The process in step S410 will be described later. On the other hand, when the control unit 320 determines in step S403 that priority computation has not been performed for every valid face region, the control unit 320 advances the processing to step S404.

The processes in steps S404 to S409 are performed for each face region detected in the image. In step S404, the priority determination unit 310 determines a position weight of the face region based on a distance from the image center to the gravity center of the face region. FIG. 5A shows an example of a relationship between the distance from the image center to the gravity center of the face region and the position weight of the face region. In FIG. 5A, a vertical axis represents the position weight, and a horizontal axis represents the distance. For example, when the gravity center of the face region is positioned at the image center, the position weight is 1.0. As the distance from the image center to the gravity center of the face region increases, the position weight is decreased. When the distance from the image center to the gravity center of the face region is not smaller than a predetermined distance, the position weight is fixed to a certain value such as 0.2. That is, the position weight is a fixed value near the image edges.

Though the position weight is reduced in a linear fashion in the range from the image center to the predetermined distance in FIG. 5A, this example is not a limit on the present invention. The position weight may instead be reduced in a curved fashion such as an exponential function or a logarithmic function, with respect to the distance. Moreover, it is assumed that the relationship between the distance from the image center to the gravity center of the face region and the position weight of the face region as exemplified in FIG. 5A is held in the ROM or the like as a table by the control unit 320 or the priority determination unit 310 beforehand. The present invention is not limited to this and the relationship between the distance from the image center to the gravity center of the face region and the position weight of the face region may be computed using a computational expression in the program.

In step S405 which follows, the priority determination unit 310 determines a size weight of the face region based on a size of the face region. FIG. 5B shows an example of a relationship between the size of the face region and the size weight of the face region. In FIG. 5B, a vertical axis represents the size weight, and a horizontal axis represents the size of the face region. For example, when the size of the face region is not smaller than a predetermined value, the size weight is 1.0. As the size of the face region becomes smaller, the size weight is reduced. When the size of the face region is not larger than another predetermined value such as a value close to a minimum size detectable by the face detection unit 309, the size weight is fixed to a certain value such as 0.2.

Though the size weight is reduced in a linear fashion in the range where the size of the face region is from the threshold to the detectable minimum size in FIG. 5B, this example is not a limit on the present invention. The size weight may instead be reduced in a curved fashion such as an exponential function or a logarithmic function, with respect to the size. Moreover, it is assumed that the relationship between the size of the face region and the size weight of the face region as exemplified in FIG. 5B is held in the ROM or the like as a table by the control unit 320 or the priority determination unit 310 beforehand. The present invention is not limited to this and the relationship between the size of the face region and the size weight of the face region may be computed using a computational expression in the program.

After the size weight of the face region is determined in step S405, the control unit 320 advances the processing to step S406. Note that only one of the processes of steps S404 and S405 may be performed. In step S406, the control unit 320 determines whether or not the continuous processing number exceeds a threshold. When the control unit 320 determines that the continuous processing number exceeds the threshold, the control unit 320 resets the continuous processing number to 0 in step S408, and then advances the processing to step S409. The process of step S409 will be described later.

When the control unit 320 determines that the continuous processing number is not more than the threshold, on the other hand, in step S407 the priority determination unit 310 obtains a previous priority ranking, that is, the most recent priority ranking, determined for the face region that is the target of processing, from the priority ranking determination unit 311. The priority determination unit 310 determines a previous priority ranking weight of the face region based on the obtained previous priority ranking.

FIG. 6 shows an example of a relationship between the previous priority ranking of the face region and the previous priority ranking weight of the face region. In FIG. 6, a vertical axis represents the previous priority ranking weight, and a horizontal axis represents the previous priority ranking. When the previous priority ranking is higher, the previous priority ranking weight is higher. As the previous priority ranking decreases, the previous priority ranking weight is reduced. When the previous priority ranking is not higher than a predetermined ranking, the previous priority ranking weight is fixed to a predetermined minimum value. In the example of FIG. 6, when the previous priority ranking result is highest (first), the previous priority ranking weight is 1.4. When the previous priority ranking result is second or third, the previous priority ranking weight is 1.2. When the previous priority ranking is not higher than the predetermined ranking (not higher than fourth in the example of FIG. 6) or when the face region has not been detected as valid data in the previous processing result, the previous priority ranking weight is 1.0.

Here, to reflect the previous priority ranking result on the current result, it is necessary to establish a correspondence relationship for the face region between the currently processed frame and the previously processed frame. For example, the priority determination unit 310 compares the position and the size of the face region according to the current detection result with a position and a size of a face region according to the previous detection result. When they have at least a predetermined level of similarity as a result of comparison, the priority determination unit 310 determines that they are the same subject. In this way, the previous priority ranking result can be reflected on the current result.

As described above, when the continuous processing number exceeds the threshold in step S406, the continuous processing number is reset in step S408 without performing the process in step S407. Thus, the influence of the previous priority ranking weight is cancelled once in a predetermined number of times (not less than 2).

After determining the previous priority ranking weight in step S407, the priority determination unit 310 computes, in step S409, a priority of the face region using the following expression (1) based on the position weight, the size weight, and the previous priority ranking weight determined respectively in steps S404, S405, and S407 described above.

$$\text{Priority} = (\text{Position weight}) \times (\text{Size weight}) \times (\text{Previous priority ranking weight}) \quad (1)$$

In the case where the continuous processing number is determined to exceed the threshold in step S406 and so the processing advances to step S409 without performing the process of step S407, the priority determination unit 310 uses, for example, 1 as the previous priority ranking weight. Likewise, in the case of processing the first frame, with there being no previous processing, the priority determination unit 310 uses, for example, 1 as the previous priority ranking weight.

After the priority determination unit 310 computes the priority of a face region in step S409, the processing returns to step S403. As mentioned earlier, when the control unit 320 determines in step S403 that the processes of steps S404 to S409 have been performed for every valid face region detected in the image, the processing advances to step S410.

In step S410, the priority ranking determination unit 311 determines a priority ranking for each of the face regions detected in the image, based on the priority computed in step S409. Here, the face regions are given the decreasing priority rankings in decreasing order of priority. The determined priority ranking of each face region is held in the priority ranking determination unit 311, and also associated with face region information (such as the position, the size, and the like of each face region in the image) and supplied to the image capture control unit 305. The image capture control unit 305 performs focusing control and exposure control as mentioned above, based on the supplied priority ranking of each face region.

After the priority ranking determination unit 311 determines the priority ranking of each face region in step S410, the processing advances to step S411 where the control unit 320 increments the continuous processing number, and then the processing returns to step S402. Note that the loop processing of steps S402 to S411 is repeated at a predetermined rate, such as a period of one frame or a period of a plurality of frames. The present invention is not limited to this and the loop processing may be repeated in accordance with a time period required for the face detection process by the face detection unit 309.

The processing according to the flowchart of FIG. 4 mentioned above is described in more detail below, with reference to FIG. 7. In an example shown in FIG. 7, face regions 200 to 203 that are substantially equal in size are each detected in frames #1, #2, ..., #n, #n+1 of a moving image in chronological order.

Figure 7:
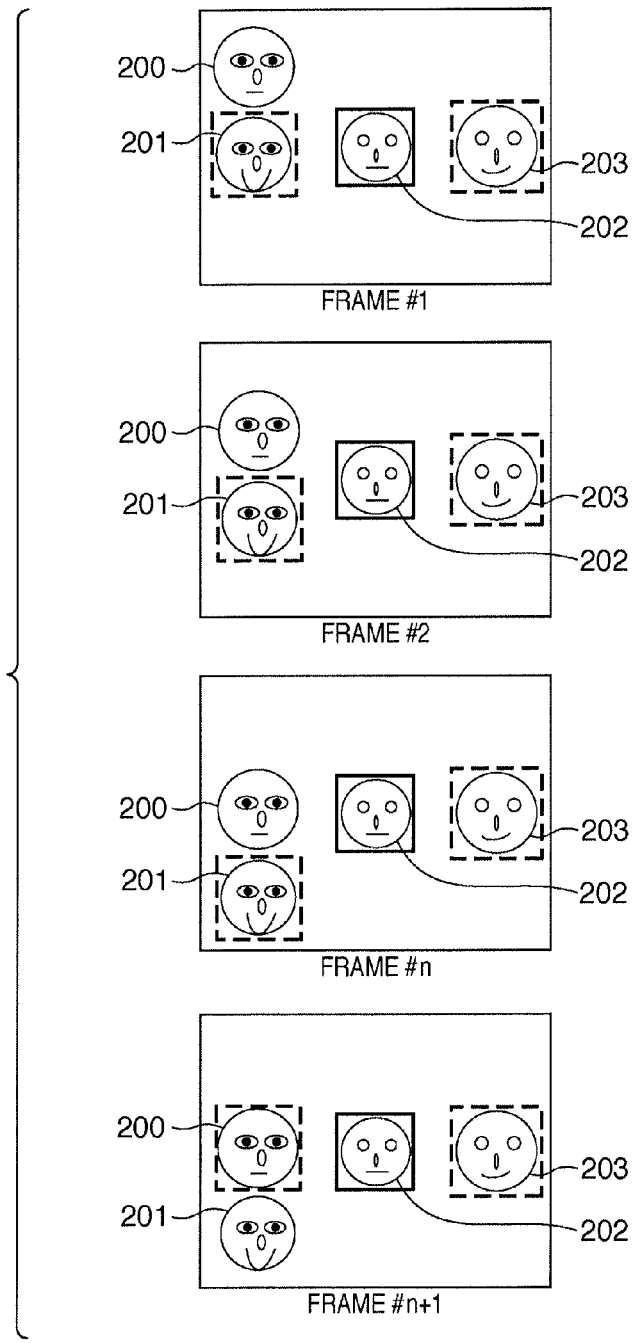
FIG. 7 is a diagram explaining the processing according to the first embodiment of the present invention in more detail.

In FIG. 7, a face region having the highest priority ranking is indicated by a solid line box, and face regions having the second and third highest priority rankings are indicated by a dashed line box. A face region having the fourth highest priority ranking or below is shown without a box. For instance, the image capture control unit 305 uses the face region having the highest priority ranking, as the control target of focusing control and exposure control. Moreover, the control unit 320 adds box displays to the face regions having the highest to third highest priority rankings, upon the display by the display unit 307. Such box displays indicate subjects whose priority rankings are not lower than a predetermined ranking.

In FIG. 7, in the first frame #1, there is no previous priority ranking determination result, so that the priority rankings are determined according to the position weights and the size weights. In the example of FIG. 7, the face region 202 positioned at the image center is given the highest priority ranking. Meanwhile, the face region 200 is farthest from the image center among the face regions 200 to 203, and so is given the lowest priority ranking.

In the next frame #2, the priority rankings are determined in consideration of the previous priority rankings, for face regions that are found to correspond to the face regions detected in frame #1. In the case where the threshold used in step S406 in FIG. 4 is n, the priority rankings are determined in consideration of the previous priority ranking result up to frame #n in FIG. 7. This being so, when there is no substantial change in the states of the detected face regions, a change of the priority rankings is suppressed. For example, even when there is a substantial change of state from frame #1 as in the case of the face regions 200 and 201 in frame #n, the priority rankings are maintained.

On the other hand, in frame #n+1, the process of step S407 is skipped since the continuous processing number exceeds the threshold, so that the previous priority ranking result is not taken into consideration. Therefore, the priority ranking of each face region is determined according to the position weight and the size weight. In other words, the priority ranking is determined according to the current states of the face regions in the image, as a result of which the state changes of the subjects are reflected more on the priority ranking of each face region. In the example of FIG. 7, the face region 201 farthest from the image center is given the lowest priority ranking.

The first embodiment describes the case where, each time the predetermined continuous processing number is reached, the priority ranking of each face region is determined without taking the previous priority ranking into consideration. However, this example is not a limit on the present invention. For instance, the priority ranking may be determined by changing how much the previous priority ranking is taken into consideration, each time the predetermined continuous processing number is reached.

According to the first embodiment described above, frequent switching of the priority ranking of each face region is suppressed during the time period when the previous priority ranking is taken into consideration. Moreover, by providing a timing in which the previous priority ranking is not taken into consideration or changing how much the previous priority ranking is taken into consideration, a priority ranking that reflects the state of the subject at a specific time is determined. Hence, appropriate priority rankings in consideration of the state changes of the subjects with time can be determined while suppressing frequent switching in the priority rankings.

Furthermore, since the priority ranking of each subject can be appropriately determined, it is possible to not only determine the main subject, but also determine the priority ranking suitable for each purpose, such as AF, AE (automatic exposure), and display, among which the priority subject may different.

Second Embodiment

The following describes a second embodiment of the present invention. When compared with the processing in the first embodiment described above, the second embodiment differs in the timing in which the previous priority ranking result is not taken into consideration in the priority determination unit 310. That is, in the second embodiment, the previous priority ranking result is not taken into consideration in the timing when an amount of change between the currently processed image and the image used when determining the previous priority ranking is found to be not smaller than a predetermined amount. In the second embodiment, whether or not a face region whose previous priority ranking is highest is present in the current image is detected as this amount of change.

Figure 8:
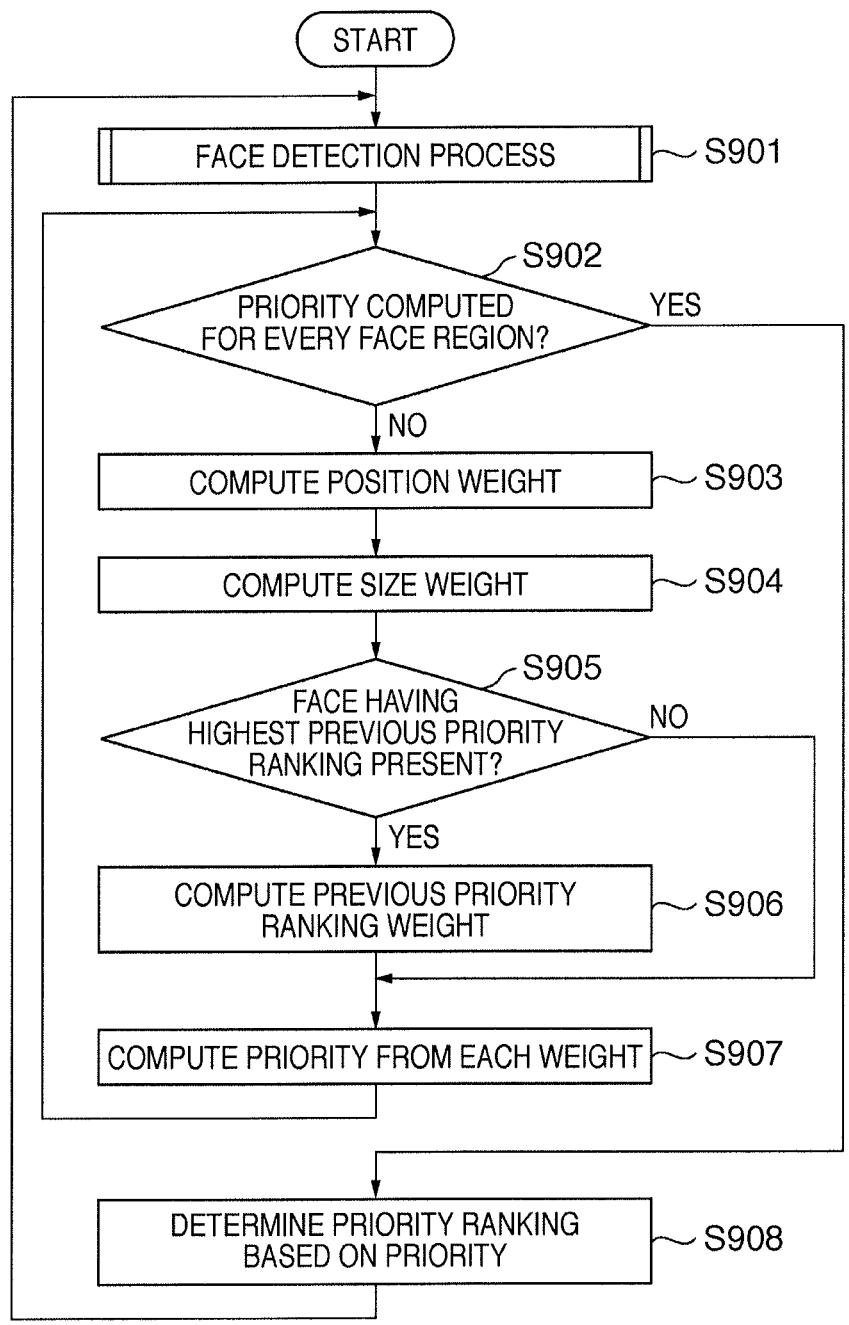
FIG. 8 is a flowchart showing an example of processing for determining priority rankings of face regions according to a second embodiment of the present invention.

FIG. 8 is a flowchart showing an example of processing for determining priority rankings of face regions according to the second embodiment. For example, the processes in this flowchart are executed by the control unit 320 controlling the face detection unit 309, the priority determination unit 310, and the priority ranking determination unit 311 according to a program, as with the flowchart of FIG. 4 described above.

The processes of steps S901 to S904 are the same as the processes of steps S402 to S405 in FIG. 4 described in the first embodiment. In detail, in step S901, the face detection unit 309 performs a face detection process on the image data of one frame to detect face regions in the image, and obtains information on the detected face regions. In step S902, which follows, the control unit 320 determines whether or not a priority has been computed for every face region detected in the image. When the control unit 320 determines that a priority has been computed for every detected face region, the processing advances to step S908. In step S908, the priority ranking determination unit 311 determines a priority ranking of each face region detected in the image based on the computed priority, as in step S410 in FIG. 4.

When the control unit 320 determines in step S902 that a priority has not been computed for every detected face region, on the other hand, the processing advances to step S903 where the priority determination unit 310 computes a position weight of a face region as in step S404 in FIG. 4. In step S904, which follows, the priority determination unit 310 computes a size weight of the face region as in step S405 in FIG. 4.

The processing then advances to step S905, and the priority determination unit 310 determines whether or not a face region whose previous priority ranking is highest is included in the face regions present in the current image. For example, the priority determination unit 310 obtains information on the face region whose previous priority ranking is highest from the priority ranking determination unit 311. The priority determination unit 310 then determines whether or not a face region corresponding to the obtained face region is present in the current image. When the priority determination unit 310 determines that the corresponding face region is not present, the processing advances to step S907. The process of step S907 will be described later.

When the priority determination unit 310 determines in step S905 that the face region whose previous priority ranking is highest is present in the current image, on the other hand, the processing advances to step S906. In step S906, the priority determination unit 310 obtains a weight of a previous priority ranking, that is, the most recent priority ranking, for the face region as in step S407 in FIG. 4.

Here, to determine whether or not the face region whose previous priority ranking is highest is present in the image, it is necessary to establish a correspondence relationship in the face region between the currently processed frame and the previously processed frame. As an example, the priority determination unit 310 compares a position and a size of the face region according to the previous detection result, with a position and a size of a face region according to the current detection result. When they have at least a predetermined level of similarity as a result of comparison, the priority determination unit 310 determines that they are the same subject. This makes it possible to determine whether or not the face region whose previous priority ranking is highest is present in the current image. Hence, the previous priority ranking result can be reflected on the face region present in the current image.

In step S907, which follows, the priority determination unit 310 computes a priority of the face region as in step S409 in FIG. 4. In detail, in step S907, the priority determination unit 310 computes the priority of the face region using the above expression (1), based on the position weight, the size weight, and the previous priority ranking weight determined respectively in steps S903, S904, and S906 described above.

After the priority of the face region is computed, the processing returns to step S902. As mentioned earlier, when the control unit 320 determines in step S902 that a priority has been computed for every detected face region, the processing advances to step S908. In step S908, the priority ranking determination unit 311 determines the priority ranking of each face region detected in the image in decreasing order of priority based on the priority computed in step S907, as in step S410 in FIG. 4. The determined priority ranking is held in the priority ranking determination unit 311, and also associated with face region information and supplied to the image capture control unit 305.

After the priority ranking of each face region is determined in step S908, the processing returns to step S901. Note that the loop processing of steps S901 to S908 is repeated at a predetermined rate, such as a period of one frame or a period of a plurality of frames, or according to a time period required for the face detection by the face detection unit 309.

The processing according to the flowchart of FIG. 8 mentioned above is described in more detail below, with reference to FIG. 9. In an example shown in FIG. 9, face regions 210 to 213 that are substantially equal in size are each detected in frames #1 to #4 of a moving image, with an object 214 being present in front of a subject of the face region 212.

Figure 9:
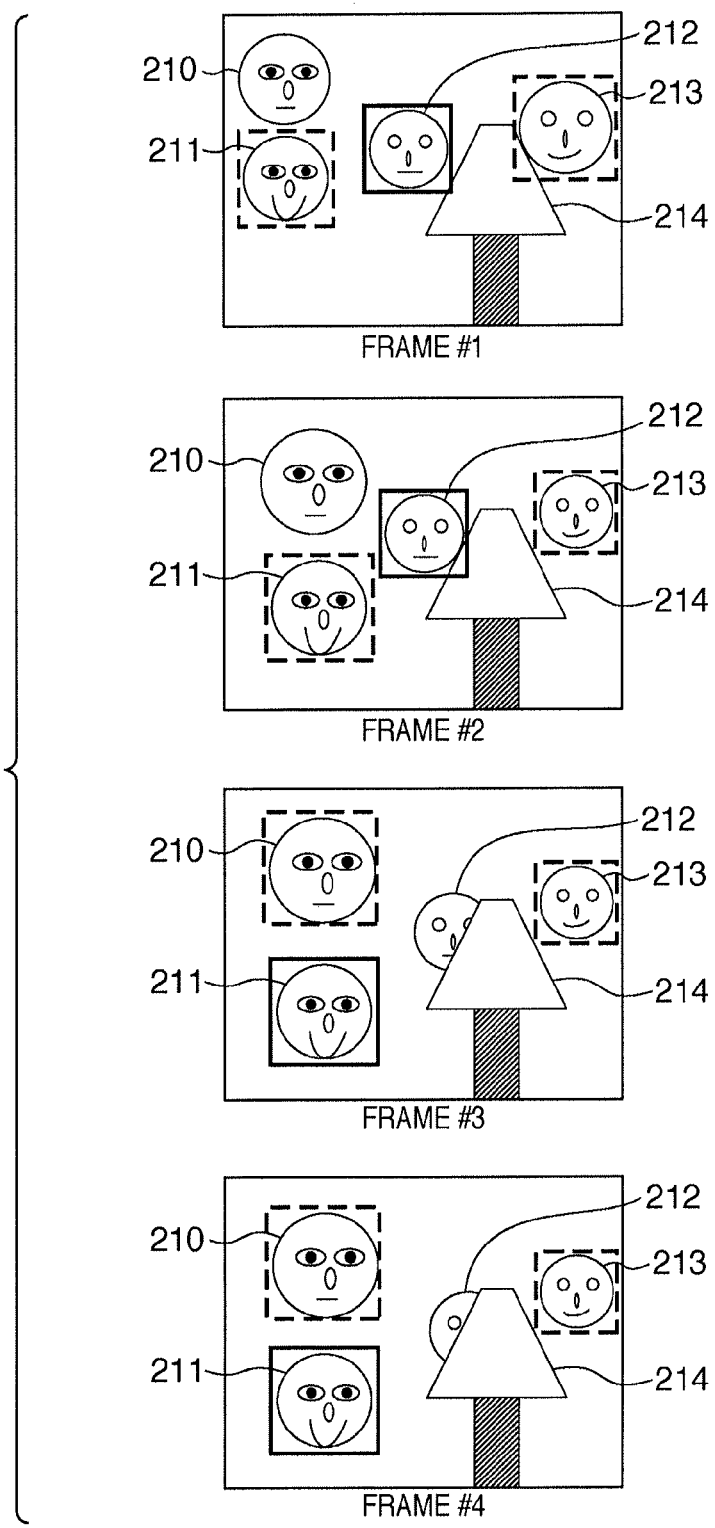
FIG. 9 is a diagram explaining the processing according to the second embodiment of the present invention in more detail.

In FIG. 9, in the first frame #1, there is no previous priority ranking determination result, so that the priority rankings are determined according to the position weights and the size weights. In the example of FIG. 9, the face region 212 positioned near the image center is given the highest priority ranking. Meanwhile, the face region 210 is farthest from the image center among the face regions 210 to 213, and so is given the lowest priority ranking.

In the next frame #2, the priority rankings are determined in consideration of the previous priority rankings, for face regions that are found to correspond to the face regions detected in frame #1. This being so, when there is no substantial change in the states of the face regions in the image, a change in the priority rankings is suppressed.

In frame #3, the face region 212 whose previous priority ranking, that is, priority ranking in frame #2, is highest is hidden behind the object 214 and is not detected by the face detection unit 309. In this case, by skipping step S906 as a result of the determination process of step S905, the priority of each face region is computed without taking the previous priority ranking result into consideration. Accordingly, the priority rankings of the face regions are determined according to the current states of the face detection results, as a result of which the state changes of the subjects are reflected more on the priority rankings.

In the next frame #4, the face region whose previous priority ranking is highest is present in the current image, so that the priority rankings are determined in consideration of the previous priority rankings.

The second embodiment describes the case where the priority ranking of each face region is determined without taking the previous priority ranking into consideration when the face region whose previous priority ranking is highest is not present. However, this example is not a limit on the present invention. For instance, the priority ranking may be determined by changing how much the previous priority ranking is taken into consideration, depending on the presence of the face region having the highest previous priority ranking.

Moreover, the priority ranking may be determined without taking the previous priority ranking into consideration when the ranking of the face region whose previous priority ranking is highest changes. An example of this is given below. First, the priority ranking is determined in the current frame while taking the previous priority ranking into consideration. As a result, when the face region whose previous priority ranking is highest is given the second highest priority ranking or below, the priority ranking is recomputed without taking the previous priority ranking into consideration.

According to the second embodiment described above, frequent switching of the priority ranking of each face region is suppressed during the time period when the previous priority ranking is taken into consideration. Moreover, by providing a timing in which the previous priority ranking is not taken into consideration or how much the previous priority ranking is taken into consideration is changed, a priority ranking that reflects the state of the subject at a specific time is determined. That is, the previous priority ranking is not taken into consideration or how much the previous priority ranking is taken into consideration is changed, in the case where the face region whose previous priority ranking is highest is not present or the ranking of such a face region changes. In this way, the priority rankings of the other face regions change synchronously with the change of the priority ranking of the face region having the highest priority ranking. Hence, appropriate priority rankings in consideration of the state change of the main subject can be determined while suppressing frequent switching in the priority rankings.

Furthermore, since the priority ranking of each subject can be appropriately determined, it is possible to not only determine the main subject, but also determine the priority ranking suitable for each purpose, such as AF, AE, and display, among which a priority subject may be different.

Third Embodiment

The following describes a third embodiment of the present invention. When compared with the processing in the first and second embodiments described above, the third embodiment differs further in the timing in which the previous priority ranking result is not taken into consideration in the priority determination unit 310. That is, in the third embodiment, the previous priority ranking result is not taken into consideration in the timing when an amount of change between the currently processed image and the image used when determining the previous priority ranking is found to be not smaller than a predetermined amount. In the third embodiment, whether or not the currently processed image has a substantial change from the image used when determining the previous priority ranking is detected.

Figure 10:
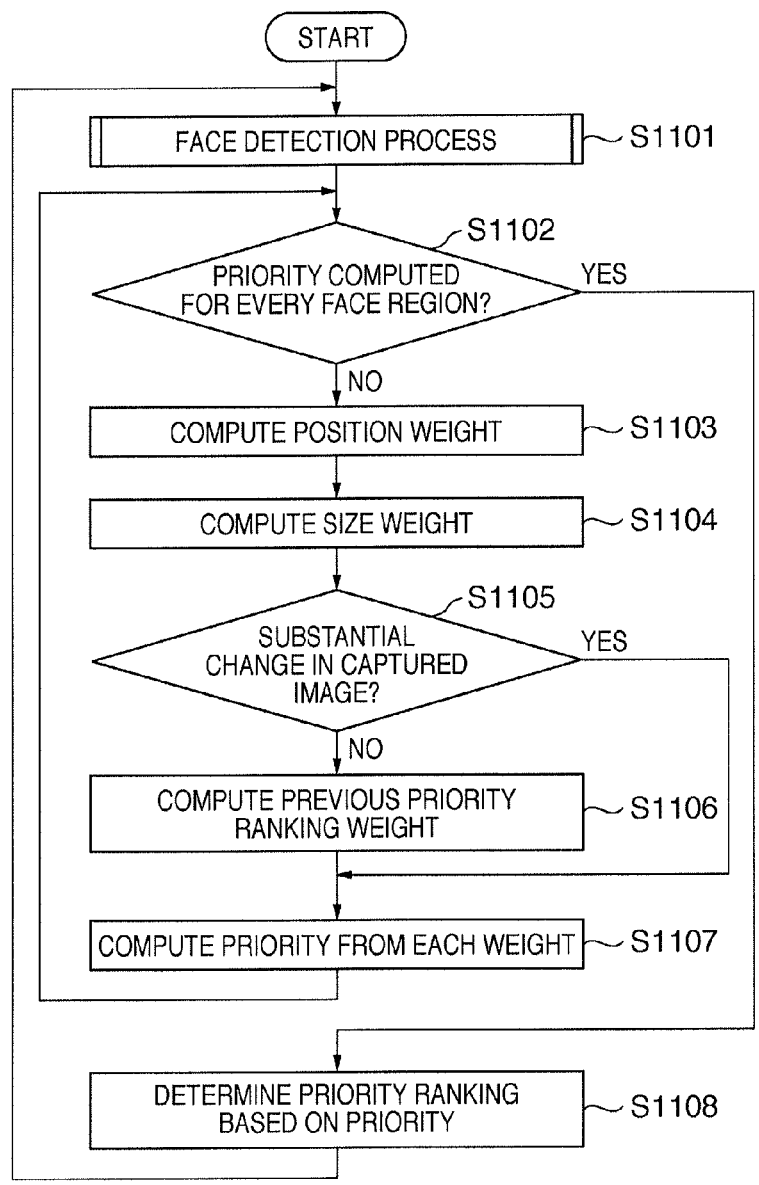
FIG. 10 is a flowchart showing an example of processing for determining priority rankings of face regions according to a third embodiment of the present invention.

FIG. 10 is a flowchart showing an example of processing for determining priority rankings of face regions according to the third embodiment. For example, the processes in this flowchart are executed by the control unit 320 controlling the face detection unit 309, the priority determination unit 310, and the priority ranking determination unit 311 according to a program, as with the flowchart of FIG. 4 described above.

The processes of steps S1101 to S1104 are the same as the processes of steps S402 to S405 in FIG. 4 described in the first embodiment. In detail, in step S1101, the face detection unit 309 performs a face detection process on the image data of one frame to detect face regions in the image, and obtains information on the detected face regions. In step S1102, which follows, the control unit 320 determines whether or not a priority has been computed for every face region detected in the image. When the control unit 320 determines that a priority has been computed for every detected face region, the processing advances to step S1108. In step S1108, the priority ranking determination unit 311 determines a priority ranking of each face region detected in the image based on the computed priority, as in step S410 in FIG. 4.

When the control unit 320 determines in step S1102 that a priority has not been computed for every detected face region, on the other hand, the processing advances to step S1103 where the priority determination unit 310 computes a position weight of a face region as in step S404 in FIG. 4. In step S1104, which follows, the priority determination unit 310 computes a size weight of the face region as in step S405 in FIG. 4.

The processing then advances to step S1105 where the priority determination unit 310 determines whether or not there is a substantial change in the captured image. For example, the change in the captured image can be detected based on the number of faces detected by the face detection unit 309 in the image. In other words, when the number of faces detected in the image changes, the priority determination unit 310 determines that there is a substantial change in the captured image.

The present invention is not limited to this. The change in the captured image may instead be detected based on a change in image capture conditions, such as a change of zoom information in the image capturing apparatus 300 or a change in an amount of blurring according to the gyro sensor. For instance, the zoom information can be obtained from the image capture control unit 305, and the change in the amount of blurring can be detected directly from the output of the gyro sensor or obtained from the image processing unit 306. In the case where the value indicating the image capture conditions changes at least by a predetermined amount, the captured image is determined to have a substantial change.

When the priority determination unit 310 determines in step S1105 that the captured image has a substantial change, the processing advances to step S1107. A process of step S1107 will be described later.

When the priority determination unit 310 determines in step S1105 that the captured image has no substantial change, on the other hand, the processing advances to step S1106. In step S1106, the priority determination unit 310 obtains a weight of a previous priority ranking, that is, the most recent priority ranking, for the face region as in step S407 in FIG. 4. The processing then advances to step S1107 where the priority determination unit 310 computes a priority of the face region as in step S409 in FIG. 4. In detail, in step S1107, the priority determination unit 310 computes the priority of the face region using the above expression (1), based on the position weight, the size weight, and the previous priority ranking weight determined respectively in steps S1103, S1104, and S1106 described above.

After the priority of the face region is computed, the processing returns to step S1102. As mentioned earlier, when the control unit 320 determines in step S1102 that a priority has been computed for every detected face region, the processing advances to step S1108. In step S1108, the priority ranking determination unit 311 determines the priority ranking of each face region detected in the image in decreasing order of priority based on the priority computed in step S1107, as in step S410 in FIG. 4. The determined priority ranking is held in the priority ranking determination unit 311, and also associated with face region information and supplied to the image capture control unit 305.

After the priority ranking of each face region is determined by the priority ranking determination unit 311 in step S1108, the processing returns to step S1101. Note that the loop processing of steps S1101 to S1108 is repeated at a predetermined rate, such as a period of one frame or a period of a plurality of frames, or according to a time period required for the face detection by the face detection unit 309.

The processing according to the flowchart of FIG. 10 mentioned above is described in more detail below, with reference to FIG. 11. In an example shown in FIG. 11, four face regions 220 to 223 are each detected in frames #1 to #4, with there being a change in captured image between frames #2 and #3 as a result of driving the zooming mechanism.

Figure 11:
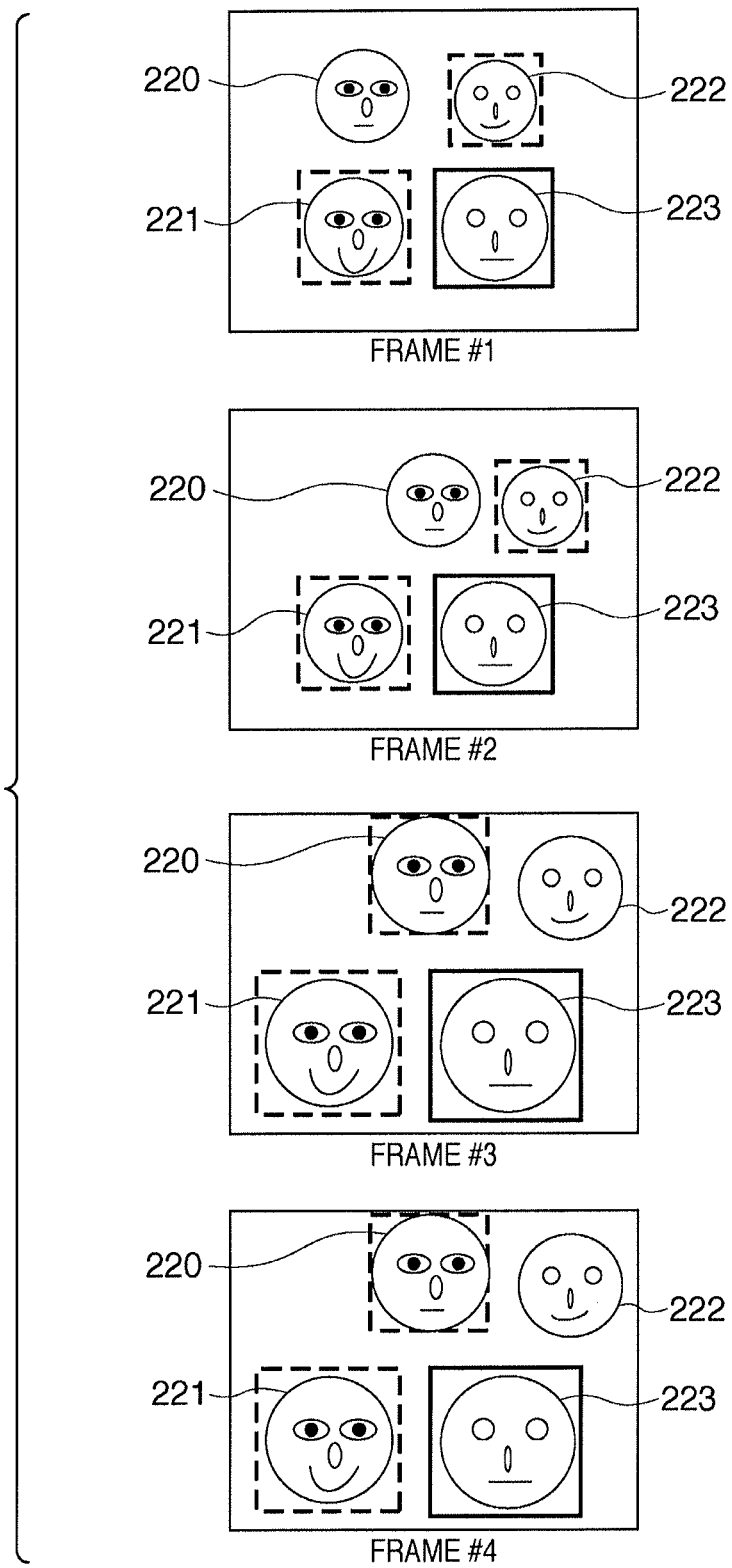
FIG. 11 is a diagram explaining the processing according to the third embodiment of the present invention in more detail.

In FIG. 11, in the first frame #1, there is no previous priority ranking determination result, so that the priority rankings are determined according to the position weights and the size weights. In the example of FIG. 11, the face region 223 positioned nearest the image center is given the highest priority ranking. Meanwhile, the face region 220 is farthest from the image center among the face regions 220 to 223, and so is given the lowest priority ranking.

In the next frame #2, the priority rankings are determined while taking the previous priority rankings into consideration, for face regions that are found to correspond to the face regions detected in frame #1. This being so, when there is no substantial change in the states of the face regions in the image, a change in the priority rankings is suppressed.

The zooming mechanism is driven between frames #2 and #3, as a result of which frame #3 has at least a predetermined amount of change of zoom information when compared with frame #2. Accordingly, the priority determination unit 310 determines in step S1105 that the captured image has a substantial change, so that the priority ranking of each face region is determined without taking the previous priority ranking result into consideration. Thus, the priority rankings of the face regions are determined according to the current states of the face detection results, as a result of which the state changes of the subjects are reflected more on the priority rankings.

In detail, in the example of FIG. 11, the face region 223 is given the highest priority ranking in frame #3, because the face region 223 is nearest the image center and also largest in size among the face regions 220 to 223. Meanwhile, the face region 222 whose priority ranking in frame #2 is second or third highest is given the lowest priority ranking, because the face region 222 is farthest from the image center among the face regions 220 to 223. The face region 220 whose priority ranking in frame #2 is lowest is given the second or third highest priority ranking, because the face region 220 is nearer the image center than the face region 222.

The third embodiment describes the case where the priority ranking of each face region is determined without taking the previous priority ranking into consideration when there is a change in the captured image. However, this example is not a limit on the present invention. For instance, the priority ranking may be determined by changing how much the previous priority ranking is taken into consideration, depending on the change in the captured image.

According to the third embodiment described above, frequent switching of the priority ranking of each face region is suppressed during the time period when the previous priority ranking is taken into consideration. Moreover, by providing a timing in which the previous priority ranking is not taken into consideration or how much the previous priority ranking is taken into consideration is changed, a priority ranking that reflects the state of the subject at a specific time is determined. That is, the previous priority ranking is not taken into consideration or how much the previous priority ranking is taken into consideration is changed, in the case where the captured image is determined to have a substantial change. In this way, switching in the priority rankings is suppressed when the change in the captured image is small, whereas the current states of the subjects are given precedence when the change in the captured image is large. Hence, appropriate priority rankings can be determined by promoting switching in the priority rankings according to the change in the captured image, while suppressing frequent switching in the priority rankings.

Furthermore, since the priority ranking of each subject can be appropriately determined, it is possible to not only determine the main subject, but also determine the priority ranking suitable for each purpose, such as AF, AE, and display, among which the priority subject may be different.

Each of the above embodiments describes the case where, when the priority determination unit 310 computes the priority, the priority ranking previously determined by the priority ranking determination unit 311 is not taken into consideration or how much the previous priority ranking is taken into consideration is reduced, according to the predetermined condition. Here, during a predetermined time period after the previous priority ranking is not taken into consideration or how much the previous priority ranking is taken into consideration is reduced, the previous priority ranking result may be taken into consideration in the priority computation regardless of such a predetermined condition. This prevents frequent occurrences of the priority computation process in which the previous priority ranking is not taken into consideration or how much the previous priority ranking is taken into consideration is reduced, with it being possible to suppress frequent switching in the priority rankings.

Each of the above embodiments describes the case where a face is detected as a subject, but the present invention is not limited to this example. The present invention is applicable to any instance where a subject of a specific shape is detected in order to extract an intended subject such as a person, an animal, or a car.

Each of the above embodiments describes the case where the present invention is applied to an image capturing apparatus, but the present invention is not limited to this example. The present invention is also applicable to a reproduction apparatus that reproduces a moving image. In the case of applying the present invention to such a reproduction apparatus, subject detection is performed on reproduction data for reproducing the moving image, and a priority ranking of each detected subject is determined. The determined priority ranking is associated with face region information and supplied to the image processing unit 306. This enables the image processing unit 306 to perform image processing on each subject according to the priority ranking.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-316275, filed on Dec. 11, 2008, which is hereby incorporated by reference herein its entirety.

What is claimed is:

1. An image processing apparatus that determines a primary subject from one or more subjects detected from an image, the image processing apparatus comprising a processor implementing the functions of:
   a detection unit that detects one or more subjects from an image;
   a computation unit that computes, for each subject detected by the detection unit, a priority for determining a primary subject; and
   a determination unit that determines the primary subject based on the priority computed for each subject by the computation unit,
   wherein the computation unit updates a priority for each subject detected by the detection unit, by calculating the priority based on a size and/or position of the subject in an image as well as a most recent priority that was determined for the subject, if the most recent primary subject is detected by the detection unit and the primary subject determined by the determination unit is the same as the most recent primary subject, and
   wherein the computation unit updates a priority for each subject detected by the detection unit, by calculating the priority based on a size and/or position of the subject in an image but not based on the most recent priority determined for the subject, if the most recent primary subject is detected by the detection unit but the primary subject determined by the determination unit is different from the most recent primary subject.

2. The image processing apparatus according to claim 1, wherein the detection unit detects one or more human faces as the one or more subjects.

3. An image processing method for determining a primary subject from one or more subjects detected from an image, the image processing method comprising:
   a detection step of detecting one or more subjects from an image;
   a computation step of computing, for each subject detected in the detection step, a priority for determining a primary subject; and
   a determination step of determining the primary subject based on the priority computed for each subject in the computation step,
   wherein the computation step includes:
   updating a priority for each subject detected in the detection step by calculating the priority based on a size and/or position of the subject in an image as well as a most recent priority that was determined for the subject, if the most recent primary subject is detected in the detection step and the primary subject determined by the determination unit is the same as the most recent primary subject, and
   updating a priority for each subject detected in the detection step by calculating the priority based on a size and/or position of the subject in an image but not based on the most recent priority determined for the subject, if the most recent primary subject is detected in the detection step but the primary subject determined in the determination step is different from the most recent primary subject.

4. The image processing method according to claim 3, wherein the detection step, one or more human faces are detected as the one or more subjects.

5. A non-transitory computer-readable storage medium storing a program that causes a computer to perform respective steps recited in claim 3.

6. An image capturing apparatus comprising:
   an image capture unit that captures images based on light incident via an imaging optical system and outputs images; and
   a processor implementing the functions of a detection unit, a computation unit and a determination unit, wherein:
   the detection unit detects one or more subjects from the images;
   the computation unit computes, for each subject detected by the detection unit, a priority for determining a primary subject; and
   the determination unit determines the primary subject based on the priority computed for each subject by the computation unit,
   wherein the computation unit updates a priority for each subject detected by the detection unit, by calculating the priority based on a size and/or position of the subject in an image as well as a most recent priority that was determined for the subject, if a change of zoom information of the image optical system is less than a predetermined amount, and
   wherein the computation unit updates a priority for each subject detected by the detection unit, by calculating the priority based on a size and/or position of the subject in an image but not based on the most recent priority determined for the subject, if the change of zoom information of the image optical system is not less than the predetermined amount.

7. An image processing method for determining a primary subject from one or more subjects detected from an image, the image processing method comprising:
   a detection step of detecting one or more subjects from an image;
   a computation step of computing, for each subject detected in the detection step, a priority for determining a primary subject; and
   a determination step of determining the primary subject based on the priority computed for each subject in the computation step,
   wherein the computation step includes:
   updating a priority for each subject detected in the detection step by calculating the priority based on a size and/or position of the subject in an image as well as a most recent priority that was determined for the subject, if a change of zoom information of the image optical system is less than a predetermined amount, and
   updating a priority for each subject detected in the detection step by calculating the priority based on a size and/or position of the subject in an image but not based on the most recent priority determined for the subject, if the change of zoom information of the image optical system is not less than the predetermined amount.

8. A non-transitory computer-readable storage medium storing a program that causes a computer to perform the respective steps recited in claim 7.

\* \* \* \* \*